(12) United States Patent
Sanma et al.

(10) Patent No.: US 8,547,215 B2
(45) Date of Patent: Oct. 1, 2013

(54) INFORMATION PRESENTATION APPARATUS AND SYSTEM

(75) Inventors: Norio Sanma, Okazaki (JP); Masanori Kawaura, Okazaki (JP); Hiroyuki Mori, Obu (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 385 days.

(21) Appl. No.: 12/926,536

(22) Filed: Nov. 24, 2010

(65) Prior Publication Data

US 2012/0126965 A1 May 24, 2012

(51) Int. Cl.
*B60Q 1/00* (2006.01)
(52) U.S. Cl.
USPC ......................................................... 340/438
(58) Field of Classification Search
USPC ................. 340/438, 435, 436, 691.2, 407.1; 701/1, 301
See application file for complete search history.

(56) References Cited

U.S. PATENT DOCUMENTS

| | | | |
|---|---|---|---|
| 4,706,072 A | 11/1987 | Ikeyama | |
| 7,245,231 B2 * | 7/2007 | Kiefer et al. | 340/903 |
| 7,369,042 B2 * | 5/2008 | Osaka et al. | 340/435 |
| 8,063,754 B2 | 11/2011 | Tanida et al. | |
| 2003/0197601 A1 * | 10/2003 | Takagi et al. | 340/435 |
| 2006/0097857 A1 | 5/2006 | Osaka et al. | |
| 2008/0061954 A1 * | 3/2008 | Kulas | 340/438 |
| 2012/0126965 A1 * | 5/2012 | Sanma et al. | 340/438 |

FOREIGN PATENT DOCUMENTS

| | | |
|---|---|---|
| JP | A-9-164858 | 6/1997 |
| JP | A-2006-199094 | 8/2006 |
| JP | A-2006-226840 | 8/2006 |
| JP | A-2007-055561 | 3/2007 |
| JP | A-2008-059459 | 3/2008 |
| JP | A-2008-077631 | 4/2008 |
| JP | A-2009-001094 | 1/2009 |

OTHER PUBLICATIONS

Office Action mailed Oct. 30, 2012 in corresponding JP Application No. 2008-181782 (and English translation).
Office Action mailed Jan. 15, 2013 in corresponding JP Application No. 2008-181782 (and English translation).

* cited by examiner

*Primary Examiner* — Phung Nguyen
(74) *Attorney, Agent, or Firm* — Posz Law Group, PLC (57) ABSTRACT

An information presentation apparatus for a vehicle is disclosed. The apparatus includes: a stimulator device located on a steering wheel of the vehicle and configured to generate stimulation at multiple sites on the steering wheel to provide skin sensation to a driver gripping the steering wheel; a direction information acquisition device configured to acquire direction information; and a controller configured to cause, in accordance with the acquired direction information, the stimulator device to successively generate the stimulation through the plurality of sites on the steering wheel to invoke an apparent movement that appears to the driver as if the skin sensation moves in a way indicative of a direction according to the direction information.

30 Claims, 3 Drawing Sheets

|  |  | BOTH HANDS GRIP CASE | ONE HAND (RIGHT HAND) GRIP CASE |
|---|---|---|---|
| FRONT | RIGHT | 41A_out→41B_out | 41A_out→41B_out |
|  | LEFT | 41F_out→41E_out | 41A_in→41B_in |
| BACK | RIGHT | 41B_out→41A_out | 41B_out→41A_out |
|  | LEFT | 41E_out→41F_out | 41B_in→41A_in |
| LEFT |  | 41E_out→(41E_in→41B_in)→41B_out | 41B_in→ 41B_out |
| RIGHT |  | 41B_out→(41B_in→41E_in)→41E_out | 41B_out→ 41B_in |

INFORMATION PRESENTATION APPARATUS AND SYSTEM

CROSS REFERENCE TO RELATED APPLICATION

The present application is based on Japanese Patent Application No. 2008-181782 field on Jul. 11, 2008, disclosure of which is incorporated herein by reference.

BACKGROUND OF THE INVENTION

1. Field of the Invention

The present invention relates to an information presentation apparatus and an information presentation system for presenting information to a driver of a vehicle.

2. Description of Related Art

There is known a technique for presenting information to a driver of a vehicle through vibrating a steering wheel of the vehicle.

For example, Patent Document 1 discloses that information about traffic jam degrees, weather types at a destination or the like is presented to a driver gripping a steering wheel, by using three-level magnitudes of vibration of the steering wheel.

Patent Document 2 discloses that a seat, a steering wheel and a gas pedal are vibrated in order to present predetermined warning information to a driver. According to Patent Document 2, in particular, multiple vibrators in the seat are intermittently vibrated, so that the driver can perceive an apparent movement phenomena and can receive information as to from which direction an object is approaching the vehicle. In the above, the apparent movement phenomenon is such phenomenon that, when two or more stimuli are successively applied at different positions at short time internals, it appears to the driver that a single stimulus is moving.

Patent Document 1: JP-A-2007-55561
Patent Document 2: JP-A-2008-77631

The inventors of the present application have found out the followings.

Patent Document 1 fails to disclose a method and a configuration for presenting direction information to a driver by using a difference in magnitude of vibration of the steering wheel. The technique disclosed in Patent Document 1 cannot allow a driver to recognize the direction information. Note that the direction information is, for example, obstacle approach information (i.e., information as to from which direction an obstacle is approaching the vehicle), vehicle travel direction (i.e., information as to in which direction the vehicle should travel according to route guidance) or like.

In a human body, since peripheral nerve for transmitting stimulation is concentrated on palms and fingers, the palms or fingers contacting with a steering wheel can allow clearer perception of stimulation as compared with a back or a femoral area contacting with the seat. Thus, the apparent movement phenomena generated by the stimulation takes place remarkably at the palms and fingers contacting with the steering wheel, compared with the back or the femoral area contacting with the seat.

However, Patent Document 2 fails to disclose that object approach direction information (information as to from which direction an object is approaching the vehicle) is presented using vibration of multiple vibrators in the steering wheel although Patent Document 2 discloses that the object approach direction information is presented using vibration of multiple vibrators in the seat. Therefore, the technique disclosed in Patent Document 2 cannot allow a driver to clearly recognize the object approach direction information.

SUMMARY OF THE INVENTION

The present invention is made in view of the foregoing. It is an objective of the present invention to provide an information presentation apparatus and an information presentation system that enable a driver to clearly and intuitively recognize direction information.

According to a first aspect of the present invention, an information presentation apparatus for a vehicle includes a stimulator device, a direction information acquisition device and a controller. The stimulator device is located on a steering wheel of the vehicle and configured to generate stimulation at a plurality of sites on the steering wheel. The stimulation causes a driver gripping the steering wheel to have skin sensation. The direction information acquisition device acquires direction information. In accordance with the direction information acquired by the direction information acquisition device, the controller causes the stimulator device to successively generate the stimulation through the plurality of sites on the steering wheel. The successively generated stimulation invokes an apparent movement that appears to the driver as if the skin sensation moves in a way indicative of a direction according to the direction information.

According to a second aspect of the present invention, an information presentation system for a vehicle includes the information presentation apparatus recited in claim 1 and a navigation apparatus. The navigation apparatus retrieves a route to a destination of the vehicle and performs guidance about vehicle travel direction based on the retrieved route. The vehicle travel direction is a direction in which the vehicle is to travel. The direction information acquisition device of the information presentation apparatus acquires, as the direction information, information about the vehicle travel direction from the navigation apparatus. In accordance with the information about the vehicle travel direction acquired by the direction information acquisition device, the controller of the information presentation apparatus causes the stimulator device to successively generate the stimulation through the plurality of sites on the steering wheel. The successively generated stimulation invokes an apparent movement that appears to the driver as if the skin sensation moves in the way according to the information about the vehicle travel direction.

According to a third aspect of the present invention, an information presentation system for a vehicle includes the information presentation apparatus recited in the first aspect and an obstacle detection apparatus. The obstacle detection apparatus detects from which direction an obstacle is approaching the vehicle, thereby providing information about an obstacle approach direction. The direction information acquisition device of the information presentation apparatus acquires, as the direction information, the information about the obstacle approach direction from the obstacle detection apparatus. In accordance with the information about the obstacle approach direction acquired by the direction information acquisition device, the controller of the information presentation apparatus causes the stimulator device to successively generate the stimulation through the plurality of sites on the steering wheel. The successively generated stimulation invokes an apparent movement that appears to the driver as if the skin sensation moves in the way according to the information about the obstacle approach direction.

According to the above information presentation apparatus and system, it is possible to allow a driver to clearly and intuitively recognize direction information.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Embodiments of the present invention will be described below with reference to the accompanying drawings.

Figure 1:
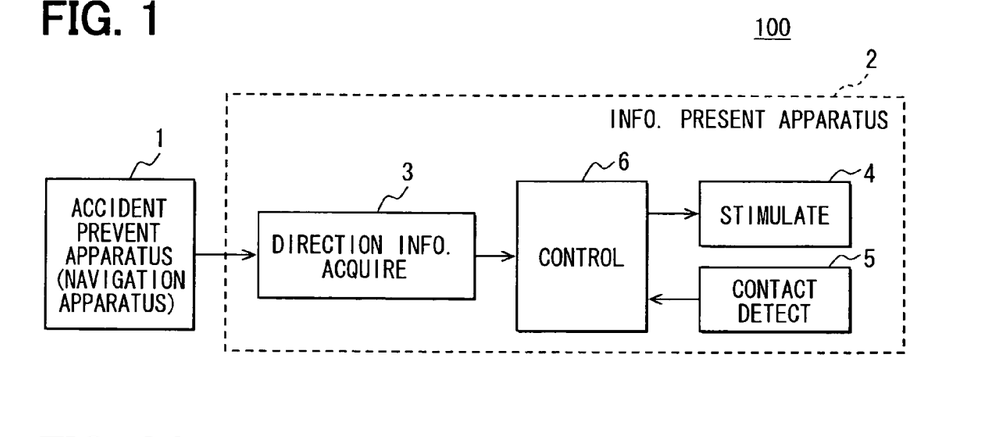
FIG. 1 is a block diagram illustrating an information presentation system.

FIG. 1 is a block diagram illustrating a schematic configuration of an information presentation system 100 according to one embodiment. The information presentation system 100 is mounted to a vehicle having a steering wheel, and includes an accidental contact prevention apparatus 1 and an information presentation apparatus 2. The information presentation apparatus 2 includes a direction information acquisition device 3, a stimulator device 4, a contact detection device 5, and an information presentation controller 6 (referred to also as a controller 6 for simplicity). Hereinafter, the vehicle equipped with the information presentation system 100 is referred to also as a subject vehicle.

The accidental contact prevention apparatus 1 detects an obstacle approach direction, i.e., detects from which direction an obstacle such as a pedestrian, a vehicle other than the subject vehicle, and the like is approaching the subject vehicle. Thus, the accidental contact prevention apparatus 1 can act as an obstacle detection apparatus. The accidental contact prevention apparatus 1 determines whether a risk of contact of the obstacle with the subject vehicle is high or low, and warns the driver of the subject vehicle. The accidental contact prevention apparatus 1 may use millimeter-wave radar, ultrasonic sonar, imaging camera, inter-vehicle communication or the like to detect from which direction the obstacle is approaching the subject vehicle. Alternatively, a known apparatus having the above function may be used as the accidental contact prevention apparatus 1. The obstacle includes a bicycle, a small motor bike, a motorcycle, and a motorcar etc.

The direction information acquisition device 3 acquires obstacle approach direction information and contact risk information from the accidental contact prevention apparatus 1. Here, the obstacle approach direction information is information as to from which direction the obstacle is approaching the subject vehicle. The contact risk information is information as to whether the risk of contact with the subject vehicle is high or low. Thus, the direction information acquisition device 3 can act as direction information acquisition means. The direction information acquisition device 3 transmits the acquired obstacle approach direction information and the contact risk information to the controller 6.

Figure 2A:
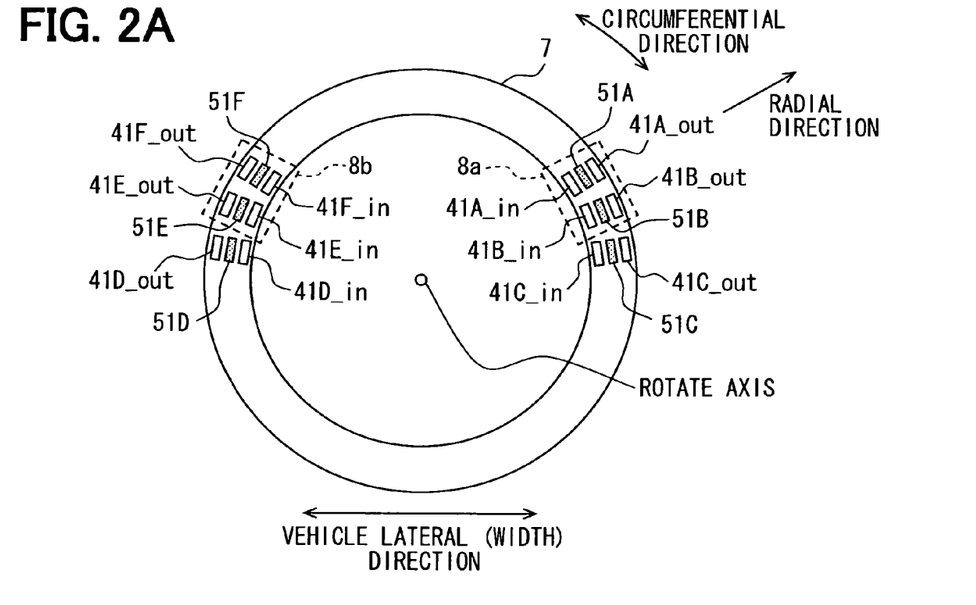
FIG. 2A is a diagram illustrating an arrangement of multiple vibrators of a stimulator device and multiple pressure sensitive elements of a contact detector device on a steering wheel, the diagram being viewed in a rotation axis direction of the steering wheel.
Figure 2B:
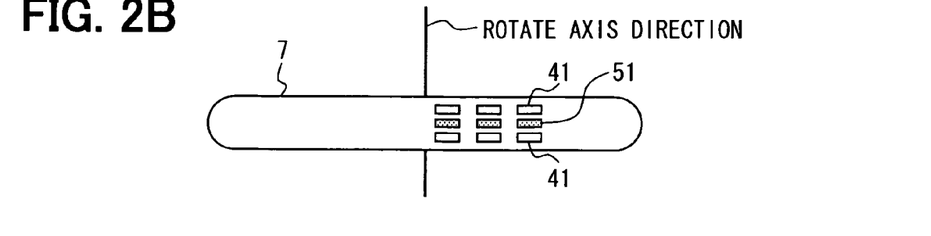
FIG. 2B is a diagram illustrating an arrangement of multiple vibrators and multiple pressure sensitive elements on a steering wheel, the diagram being viewed in a vehicle width direction.
Figure 5:
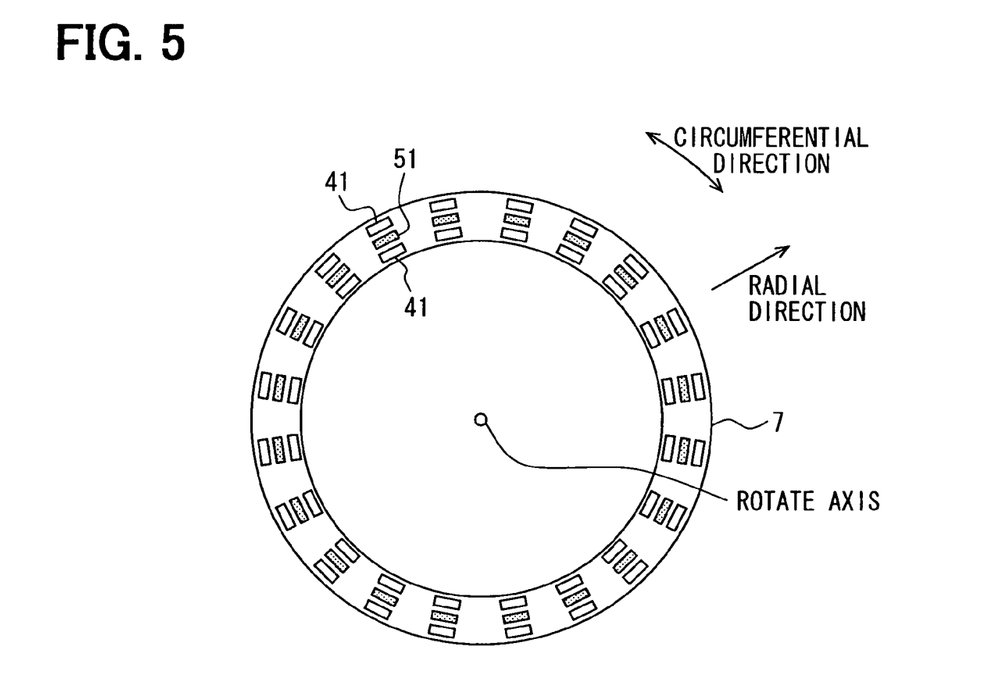
FIG. 5 is a diagram illustrating an arrangement of multiple vibrators arranged all around a steering wheel in a circumferential direction of the steering wheel.

The stimulator device 4 of the information presentation apparatus 2 generates stimulation, which provides skin sensation to a driver gripping a steering wheel 7 of the subject vehicle. The stimulator device 4 can generate the stimulation (stimuli) at multiple sites. In accordance with instructions from the controller 6, the stimulator device 4 generates successive stimulation through these multiple sites. The stimulator, device 4 can act as stimulator means. The stimulator device 4 includes multiple vibrators 41 for generating vibration, as shown in FIG. 2A, 2B and 5. The multiple vibrators 41 may be known ones. These vibrators 41 are arranged at multiple sites on the steering wheel 7 to generate the stimulation at the multiple sites on the steering wheel 7 so that the stimulation provides tactile sensation to the driver. Details of the generation of successive stimulation through multiple sites on the steering wheel 7 using the multiple vibrators 41 will be described later.

The contact detection device 5 of the information presentation apparatus 2 detects which portion (i.e., region) of the steering wheel 7 the driver of the subject vehicle is gripping. The contact detection device 5 includes multiple pressure sensitive elements 51 for detecting pressure application, as shown in FIG. 2A, 2B and 5. These pressure sensitive elements 51 are arranged at multiple sites on the steering wheel 7, thereby detecting a portion of the steering wheel 7 gripped by the driver of the subject vehicle. The contact detection device 5 transmits a detection result to the controller 6. Details of arrangement of the multiple pressure sensitive elements 51 on the steering wheel 7 will be described later.

The controller 6 includes a computer having a CPU, a memory such as ROM, RAM and the like, an I/O, and a bus line connecting the forgoing components, any of which is not shown in the drawings. In accordance with the obstacle approach direction information from the direction information acquisition device 3, the controller 6 controls the stimulator device 4 so that: the stimulator device 4 generates the stimulation in the portion of the steering wheel 7 detected by the contact detection device 5; and the generated stimulation invokes an apparent movement that appears to the driver as if the skin sensation moves in a direction according to the obstacle approach direction information (i.e., in a way indicative of a direction according to the obstacle approach direction information). When the contact risk information transmitted from the direction information acquisition device 3 indicates that the risk of contact is high, the controller 6 instructs (i.e., control) the stimulator device 4 to generate the above-described stimulation. The apparent movement recited herein includes the following phenomena; when two or more stimuli are generated continuously at different positions or when two or more stimuli are generated at certain intervals at different positions, it appear to a human being that a single stimulation moves between these different positions. Details of how the controller 6 controls the stimulator device 4 in accordance with the obstacle approach direction information will be described later.

Now, with reference to FIG. 2, explanation will be given on an arrangement of multiple vibrators 41 of the stimulator device 4 and multiple pressure sensitive elements 51 of the contact detection device 5 on the steering wheel 7. FIG. 2 is a diagram illustrating an arrangement of multiple vibrators 41 of the steering wheel 7 and multiple pressure sensitive elements 51 of the contact detection device 5 on the steering wheel 7. In one embodiment, the multiple vibrators 41 of the stimulator device 4 and the multiple pressure sensitive elements 51 of the contact detection device 5 are arranged on a driver-side surface of the steering wheel 7. The multiple vibrators 41 and the multiple pressure sensitive elements 51 are lactated generally at, for example, predetermined two portions of the steering wheel 7. The predetermined two portions may be portions that the driver normally grips with both hands when the vehicle is traveling straight. The predetermined two portions may be at 10 o'clock and 10 minutes, respectively. In FIG. 2, the predetermined two portions of the steering wheel 7 are shown as regions surrounded by the dashed lines. Hereinafter, one of the two portions to be gripped with a right hand is referred to as a right hand side portion 8a. The other to be gripped with a left hand is referred to as a left hand side portion 8b.

It should be noted that, although the two portions of the steering wheel 7 where the multiple vibrators 41 and the multiple pressure sensitive elements 51 are located are at 10 o'clock 10 and minutes in the above example, the arrangement is not limited to the above example. For example, the two portions may be at 8 o'clock and 20 minutes, or other positions.

The multiple vibrators 41 of the stimulator device 4 can be divided (i) inner peripheral side vibrators $41A_{in}$ to $41F_{in}$ located on an inner peripheral side portion of the steering wheel 7 and (ii) outer peripheral side vibrators $41A_{out}$ to $41F_{out}$ located on an outer peripheral side portion of the steering wheel 7. The inner peripheral side vibrators $41A_{in}$ to $41C_{in}$ and the outer peripheral side vibrators $41A_{out}$ to $41C_{out}$ are located generally in the right hand side portion 8a, as shown in FIG. 2. The inner peripheral side vibrators $41D_{in}$ to $41F_{in}$ and the outer peripheral side vibrators $41D_{out}$ to $41F_{out}$ are located generally in the left hand side portion 8b, as shown in FIG. 2. A set of the inner peripheral side vibrators $41A_{in}$ to $41C_{in}$ and a set of the outer peripheral side vibrators $41A_{out}$ to $41C_{out}$ are arranged in a radial direction of the steering wheel 7. The radial direction is a direction from an inner peripheral side to an outer peripheral side of the steering wheel 7. In other words, the inner peripheral side vibrators $41A_{in}$ to $41C_{in}$ are located inward of the outer peripheral side vibrators $41A_{out}$ to $41C_{out}$ in the radial direction of the steering wheel 7. A set of the inner peripheral side vibrators $41D_{in}$ to $41F_{in}$ and a set of the outer peripheral side vibrators $41D_{out}$ to $41F_{out}$ are also arranged in the radial direction of the steering wheel 7. In the drawings, the peripheral side vibrators $41A_{in}$ to $41F_{in}$ are expressed as the vibrators $41A_{in}$ to $41F_{in}$, the outer peripheral side vibrators $41A_{out}$ to $41F_{out}$ are expressed as the vibrators $41A_{out}$ to $41F_{out}$.

The inner peripheral side vibrators $41A_{in}$ to $41F_{in}$ are arranged in a line at predetermined intervals in a circumferential direction of the steering wheel 7. The outer peripheral side vibrators $41A_{out}$ to $41F_{out}$ are arranged in a line at predetermined intervals in a circumferential direction of the steering wheel 7. The predetermined interval may be set so that, when the driver grips the steering wheel 7, at least two of the inner peripheral side vibrators $41A_{in}$ to $41C_{in}$ and at least two of the outer peripheral side vibrator $41A_{out}$ to $41C_{out}$ can contact with one hand of the driver, or at least two of the inner peripheral side vibrators $41D_{in}$ to $41F_{in}$ and at least two of the outer peripheral side vibrator $41D_{out}$ to $41F_{out}$ can contact with one hand of the driver. The driver considered in the above case may be a driver of typical or canonical built, or may be every driver regardless of gender and built.

The multiple pressure sensitive elements 51A to 51F are located generally in the right hand side portion 8a and the left hand side portion 8b. Specifically, the pressure sensitive elements 51A to 51C are located generally in the right hand side portion 8a and the pressure sensitive element 51D to 51F are located generally in the left hand side portion 8b. On the driver side surface of the steering wheel 7, the pressure sensitive elements 51A to 51C are located between the inner peripheral side vibrators $41A_{in}$ to $41C_{in}$ and the outer peripheral side vibrators $41A_{out}$ and $41C_{out}$. On the driver-side surface of the steering wheel 7, the pressure sensitive elements 51D to 51F are located between the inner peripheral side vibrators $41D_{in}$ to $41F_{in}$ and the outer peripheral side vibrators $41D_{out}$ and $41F_{out}$. The pressure sensitive elements 51A to 51F are arranged in a line at predetermined intervals in the circumferential direction of the steering wheel 7. The predetermined interval may be set so that, when the driver grips the steering wheel 7, at least one of the pressure sensitive elements 51A to 51F can contact with one hand of the driver. The driver considered in the above case may be a driver of typical or canonical built, or may be every driver regardless of gender and built.

In the case illustrated in FIG. 2, the vibrators 41 and the pressure sensitive elements 51 are arranged so that when the driver grips the right hand side portion 8a, four vibrators 41 (e.g., two inner peripheral side vibrators $41A_{in}$, $41B_{in}$ and two outer peripheral side vibrators $41A_{out}$, $41B_{out}$) and two pressure sensitive elements 51 (e.g., elements 51A, 51B) contact with the driver's hand. When the driver grips the left hand side portion 8b with a hand, the four vibrators 41 (e.g., two inner peripheral side vibrators $41E_{in}$, $41F_{in}$ and two outer peripheral side vibrators $41E_{out}$, $41F_{out}$) and the two pressure sensitive elements 51 (elements 51E, 51F) contact with the driver's hand.

In the above-described example, the pressure sensitive elements 51 are arranged between the inner peripheral side vibrators 41 and the outer peripheral vibratos 41 on the driver side surface of the steering wheel 7. However, the arrangement is not limited this example. Arrangement of the pressure sensitive elements 51 may be arbitrary as long as the following is attained. When the driver grips the steering wheel with one hand, and when the one hand contacts with at least four vibrators 41 (which may be a 2×2 array, each column being arranged in the radial direction of the steering wheel 7, and each row being arranged in the circumferential direction), the one hand can contact with at least one pressure sensitive element 51.

Figure 3:
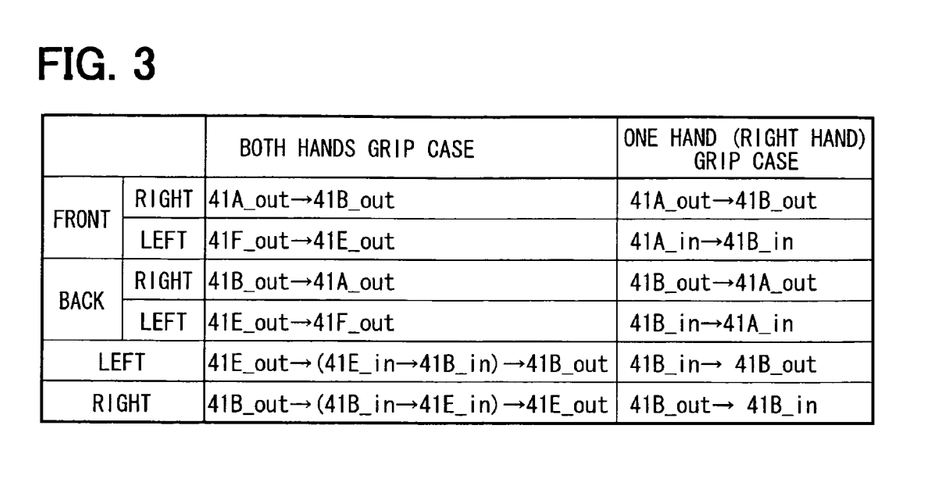
FIG. 3 is a diagram illustrating a relationship between obstacle approach direction and operation order of multiple vibrators.

With reference to FIG. 3, explanation is given on how the controller 6 controls the stimulator device 4 in accordance with the obstacle approach direction information. FIG. 3 is a diagram illustrating a correspondence relationship between obstacle approach direction and operation order of multiple vibrators 41. FIG. 3 illustrates examples of setting for "both hands gripping case" and setting for "one handle (right hand) gripping case". The setting for "both hands gripping case" refers to setting of an order of operations of multiple vibrators 41 of the stimulator device 4 for a case where a driver is gripping the steering wheel 7 with both hands. The setting for "one hand gripping case" refers to setting of an order of operations of multiple vibrators 41 of the stimulator device 4 for a case where a driver is gripping the steering wheel 7 with one hand. The setting for "both hands gripping case" illustrated in FIG. 3 is based on an assumption that the driver are gripping the right hand side portion 8a and the left hand side, portion 8b. The setting for "one hand (right hand) gripping case" illustrated in FIG. 3 is based on an assumption that the driver is gripping the right hand side portion 8a.

Based on a result of detection by the contact detection device 5, the controller 6 controls operation of multiple vibrators 41 located on the portion gripped by the driver. For example, when the result of detection indicates that the pressure is applied to the pressure sensitive element 51A, 51B, the controller 6 determines that the right hand side portion 8a is gripped by the driver, and the controller 6 controls two inner peripheral side vibrators $41A_{in}$ and $41B_{in}$ and two outer peripheral side vibrators $41A_{out}$, $41B_{out}$.

The setting for "both hands gripping case" will be described. As shown in FIG. 3, when the obstacle approach direction information indicates that the obstacle is approaching the subject vehicle from the right front of the subject vehicle, multiple vibrators 41 of the stimulator device 4 are successively operated in an order of the outer peripheral side vibrator $41A_{out}$ and the outer peripheral side vibrator $41B_{out}$. Because of this, an apparent movement perceived by the driver gripping the steering wheel 7 is such that the skin sensation in the right hand moves in a lower direction of the vehicle. Since the lower direction and the upper direction of the vehicle typically correspond to the front direction and the back direction of the vehicle on a two-dimensional or three-dimensional map displayed on a display device of an in-vehicle navigation apparatus, the driver can easily recognize the lower direction as the back direction. Therefore, the driver gripping the steering wheel 7 can get perception that the skin sensation moves from the right front of the subject vehicle to the right back of the subject vehicle.

When the obstacle approach direction information indicates that the obstacle is approaching the subject vehicle from the left front of the subject vehicle, multiple vibrators 41 of the stimulator device 4 are successively operated in an order of the outer peripheral side vibrator $41F_{out}$ and the outer peripheral side vibrator $41E_{out}$. In this case, through a manner similar to the above-described manner, the driver gripping the steering wheel 7 can get perception that the skin sensation moves from the left front of the subject vehicle to the left back of the subject vehicle. When the obstacle approach direction information indicates that the obstacle is approaching the subject vehicle from the right back of the subject vehicle, multiple vibrators 41 of the stimulator device 4 are successively operated in an order of the outer peripheral side vibrator $41B_{out}$ and the outer peripheral side vibrator $41A_{out}$. In this case, through a manner similar to the above-described manner, the driver gripping the steering wheel 7 can get perception that the skin sensation moves from the right back of the subject vehicle to the right front of the subject vehicle. When the obstacle approach direction information indicates that the obstacle is approaching the subject vehicle from the left back of the subject vehicle, multiple vibrators 41 of the stimulator device 4 are successively operated in an order of the outer peripheral side vibrator $41E_{out}$ and the outer peripheral side vibrator $41F_{out}$. In this case, through a manner similar to the above-described manner, the driver gripping the steering wheel 7 can get perception that the skin sensation moves from the left back of the subject vehicle to the left front of the subject vehicle.

As can be seen from the above, the controller 6 can cause the stimulator device 4 to successively generate the stimulation at multiple sites arranged in the circumferential direction of the steering wheel 7, thereby invoking an apparent movement that appears to the driver as if the skin sensation moves in the front/back direction of the vehicle.

When the obstacle approach direction information indicates that the obstacle is approaching the subject vehicle from the left of the subject vehicle, multiple vibrators 41 of the stimulator device 4 are successively operated in an order of the outer peripheral side vibrator $41E_{out}$ and the outer peripheral side vibrator $41B_{out}$, or in an order of the outer peripheral side vibrator $41E_{out}$, the inner peripheral side vibrator $41E_{in}$, the inner peripheral side vibrator $41B_{in}$ and the outer peripheral side vibrator $41B_{out}$. Because of this, an apparent movement perceived by the driver gripping the steering wheel 7 is such that the skin sensation moves from the left hand to the right hand, in other words, the skin sensation moves in the left-right direction of the vehicle. Thus, it appears to the driver gripping the steering wheel 7 that the skin sensation moves from the left of the subject vehicle to the right of the subject vehicle. When the obstacle approach direction information indicates that the obstacle is approaching the subject vehicle from the right of the subject vehicle, multiple vibrators 41 of the stimulator device 4 are successively operated in an order of the outer peripheral side vibrator $41B_{out}$ and the outer peripheral side vibrator $41E_{out}$, or in an order of the outer peripheral side vibrator $41B_{out}$, the inner peripheral side vibrator $41B_{in}$, the inner peripheral side vibrator $41E_{in}$ and the outer peripheral side vibrator $41E_{out}$. In this case, through a manner similar to the above-described manner, the driver gripping the steering wheel 7 can get perception that the skin sensation moves from the right of the subject vehicle to the left of the subject vehicle.

As can be seen from the above, the controller 6 can cause the stimulator device 4 to successively generate the stimulation at multiple sites arranged in the width direction (i.e., a lateral direction of the subject vehicle (more specifically, at multiple sites different in position from each other in the left/right direction), thereby invoking an apparent movement that appears to the driver that the skin sensation moves in the left/right direction.

Next, the setting for "one hand (right hand) gripping case" will be explained below.

The setting for "one hand (right hand) gripping case" can be same as the setting for "both hands gripping case", for the following case. The obstacle approach direction information indicates that the obstacle is approaching the subject vehicle from the right front of the subject vehicle or from the right back of the subject vehicle.

When the obstacle approach direction information indicates that the obstacle is approaching the subject vehicle from the left front of the subject vehicle, multiple vibrators 41 of the stimulator device 4 are successively operated in an order of the inner peripheral side vibrator $41A_{in}$ and the inner peripheral side vibrator $41B_{in}$. Because of this, the driver gripping the steering wheel 7 perceives an apparent movement at the inner peripheral side portion of a contact region between the right hand and the steering wheel 7 (the left side portion of the contact region in this case), so that the skin sensation moves in the lower direction of the vehicle. As described above, since the driver can easily recognize the lower direction as the back direction of the vehicle in general, the driver gripping the steering wheel 7 gets perception that the skin sensation moves from the left front of the subject vehicle to the left back of the subject vehicle. When the obstacle approach direction information indicates that the obstacle is approaching the subject vehicle from the left back of the subject vehicle, multiple vibrators 41 of the stimulator device 4 are successively operated in an order of the inner peripheral side vibrator $41B_{in}$ and the inner peripheral side vibrator $41A_{in}$. In this case, through a manner similar to the above-described manner, the driver gripping the steering wheel 7 can get perception that the skin sensation moves from the left back of the subject vehicle to the left front of the subject vehicle.

As can be seen from the above, the multiple sites are arranged in rows in the circumferential direction of the steering wheel 7 and columns in the radial direction of the steering wheel 7 (i.e., a direction from the inner peripheral side to the outer peripheral side). In other words, the multiple sites are includes a group of sites located on the inner peripheral side portion and another group of sites located on the outer peripheral side portion. The stimulator device 4 can successively generate the stimulation at either the group of sites on the inner peripheral side portion or another group of sites located on the outer peripheral side portion. Thus, even when the driver is gripping the steering wheel 7 with only one hand, the successively generated stimulation invokes an apparent movement that appears to the driver as if the skin sensation moves in the front/back direction on one of a left side and a right side of the vehicle.

When the obstacle approach direction information indicates that the obstacle is approaching the subject vehicle from the left of the subject vehicle, multiple vibrators 41 of the stimulator device 4 are successively operated in an order of the inner peripheral side vibrator $41B_{in}$ and the outer peripheral side vibrator $41B_{out}$. Because of this, an apparent movement appears to the driver gripping the steering wheel 7, as if the skin sensation moves from the inner peripheral side portion (i.e., a left side in this case) to the outer peripheral side portion (i.e., a right side in this case) of a contact region between the right hand and the steering wheel 7. Thus, the driver gripping the steering wheel 7 gets perception that the skin sensation moves from the left of the subject vehicle to the right of the subject vehicle. When the obstacle approach direction information indicates that the obstacle is approaching the subject vehicle from the right of the subject vehicle, multiple vibrators 41 of the stimulator device 4 are successively operated in an order of the outer peripheral side vibrator $41B_{out}$ and the inner peripheral side vibrator $41B_{in}$. In this case, in a manner similar to the above-described manner, the driver gripping the steering wheel 7 can get perception that the skin sensation moves from the right of the subject vehicle to the left of the subject vehicle.

As can be seen from the above, the stimulator device 4 can successively generate the stimulation at multiple sites arranged in the radial direction from the inner peripheral side to the outer peripheral side of the steering wheel. Thereby, even when the driver is gripping the steering wheel with only one hand, it is possible to invoke an apparent movement that appears as if the skin sensation moves in the left/right direction of the vehicle.

For illustrative purpose, FIG. 3 does not illustrate examples of the setting for "one hand (left hand) gripping case", which is the setting of an operation order of multiple vibrators 41 of the stimulator device 4 for a case where a driver is gripping the steering wheel 7 with the left hand. The setting for "one hand (left hand) gripping case" can be made in the substantially same manner as the setting for "one hand (right hand) gripping case". Specifically, the setting for "one hand (left hand) gripping case" can be obtained from the setting for "one hand (right hand) gripping case" by the following replacements: using the inner peripheral side vibrator $41F_{in}$ in place of the outer peripheral side vibrator $41A_{out}$; using the inner peripheral side vibrator $41E_{in}$ in place of the outer peripheral side vibrator $41B_{out}$; using the outer peripheral side vibrator $41F_{out}$ in place of the inner peripheral side vibrator $41A_{in}$; and using the outer peripheral side vibrator $41E_{out}$ in place of the inner peripheral side vibrator $41B_{in}$.

Multiple vibrators 41 of the stimulator device 4 may generate the vibration to cause the driver to perceive the above-described apparent movement, by using at least one of vibration frequency, vibration magnitude and vibration duration.

The controller 6 may prospectively store a table like that shown in FIG. 3 in a memory such as the ROM of the controller 6 and the like. By referring to the table on the basis of the obstacle approach direction information transmitted from the direction information acquisition device 3, the controller 6 may control the stimulator device 4 in accordance with the obstacle approach direction information. Alternatively, a program for controlling the stimulator device 4 with the setting like that shown in FIG. 3 may be stored in a memory such as the RAM of the controller 6 and the like. By executing this program on the basis of the obstacle approach direction information transmitted from the direction information acquisition device 3, the controller 6 may control the stimulator device 4 in accordance with the obstacle approach direction information.

The correspondence relationship between the obstacle approach direction and the operation order of multiple vibrators 41 of the stimulator device 4 shown in FIG. 3 is merely an example. The correspondence relationship is riot limited to that shown in FIG. 3. For example, multiple correspondence relationships according to driver's grip positions may further exists. Moreover, a correspondence relationship may further exist in order to associate a further obstacle approach direction with an operation of multiple vibrators 41 of the stimulator device 4.

Figure 4:
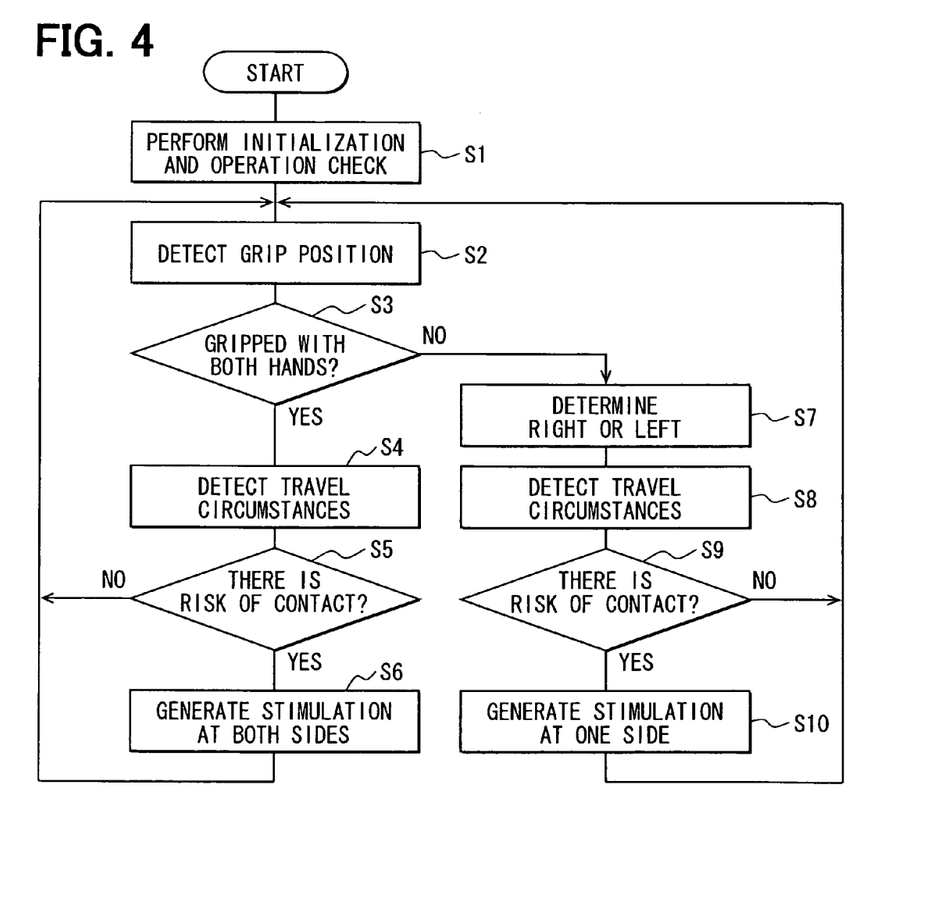
FIG. 4 is a flowchart illustrating an operation flow of an information presentation apparatus.

Operation of the information presentation apparatus 2 will be illustrated with reference to a flowchart illustrated in FIG. 4. The operation illustrated in FIG. 4 is started when an ignition switch of the subject vehicle is switched on. The below-described explanation on the operation in FIG. 4 covers the following example cases where (i) the right hand side portion 8a and the left hand side portion 8b of the steering wheel 7 are gripped with both hands, (ii) the right hand side portion 8a of the steering wheel 7 is gripped with only a right hand, and (iii) the left hand side portion 8b of the steering wheel 7 is gripped with a left hand.

At S1, initialization and operation check are performed on the generally whole of the information presentation apparatus 2, and the operation proceeds to S2. If abnormality is discovered in the operation check, an error is displayed and the operation is ended for example.

At S2, driver's grip position on the steering wheel 7 is detected with the contact detection device 5, and the operation proceeds to S3.

At S3, based on a result of detection by the contact detection device 5, the controller 6 make a determination as to whether the driver is gripping the steering wheel 7 with both hands or with only one hand. This determination may be made based on, for example, whether the contact with the driver is detected with both of (i) any one of the pressure sensitive element 51A to 51C and (ii) any one of the pressure sensitive element 51D to 51F. That is, when the contact is detected with the both, it may be determined that the steering wheel 7 is gripped with both hands. When the contact is detected with either (i) any one of the pressure sensitive element 51A to 51C or (i) any one of the pressure sensitive element 51D to 51F, it may be determined that the steering wheel 7 is gripped with one hand. When it is determined that the steering wheel 7 is gripped with both hands, the determination YES is made at S3, and the operation proceeds to S4. When it is determined that the steering wheel 7 is gripped with one hand, the determination NO is made at S3, and the operation proceeds to S7.

At S4, the direction information acquisition device 3 acquires the obstacle approach direction information and the contact risk information, in other words, the direction information acquisition device 3 detects travel circumstances. After S4, the operation proceeds to S5.

At S5, based on the contact risk information transmitted from the directional information acquisition device 3, the controller 6 determines whether there is an obstacle carrying a high risk of contact with the subject vehicle. In other words, the controller 6 determines whether there is a risk of contact. When it is determined that there is a risk of contact, the determination YES is made and the operation proceeds to S6. When it is determined that there is no risk of contact, the determination NO is made and the operation returns to S2.

At S6, based on the obstacle approach direction information transmitted from the direction information acquisition device 3 and the result of the detection by the contact direction device 5, the controller 6 controls the stimulator device 4 in such manner that, at the driver's grip positions on the steering wheel 7 (i.e., at the two hands grip position), the stimulator device 4 generates the stimulation that invokes an apparent movement appearing to the driver as if the skin sensation moves in a way indicative of the direction in accordance with the obstacle approach direction. Through causing the stimulator device 4 to generate the above stimulation to provide the apparent movement to the driver, the controller 6 presents the obstacle approach direction, i.e., information about a direction from which the obstacle is approaching the subject vehicle. After S6, the operation returns to S2.

More specifically, the controller 6 controls the stimulator device 4 and operates multiple vibrators 41 of the stimulator device 4 in such manner that the multiple vibrators 41 of the stimulator device 4 are successively vibrated in the order in accordance with the setting for "both hands gripping case" illustrated in FIG. 3. One relevant example situation may be as follows; the driver is gripping the steering wheel 7 with both hands; an obstacle is approaching from the right side at a blind intersection; and it is determined that the obstacle carries the risk of contact. In this situation, multiple vibrators 41 of the stimulator device 4 may be successively vibrated in the order of the outer peripheral side vibrator $41B_{out}$, the inner peripheral side vibrator $41B_{in}$, the inner peripheral side vibrator $41E_{in}$, and the outer peripheral side vibrator $41E_{out}$, or in the order of the outer peripheral side vibrator $41B_{out}$ and the outer peripheral side vibrator $41E_{out}$ until the obstacle passes the subject vehicle.

At S7, the controller 6 determines whether the driver is gripping the steering wheel 7 with the right hand or the left hand. In other words, the controller 6 makes a right left determination. For example, the determination at S7 may be made based on whether contact with the driver is detected with either (i) any one of the pressure sensitive elements 51A to 51C or (ii) any one of the pressure sensitive elements 51D to 51F. When the contact with the driver is detected with any one of the pressure sensitive elements 51A to 51C, it may be determined that the driver is gripping the steering wheel 7 with the right hand. When the contact with the driver is detected with any one of the pressure sensitive elements 51D to 51F, it may be determined that the driver is gripping the steering wheel 7 with the left hand. After S7, the flow proceeds to S8.

At S8, the direction information acquisition device 3 acquires the obstacle information approach direction information and the contact risk information. In other words, the direction information acquisition device 3 detects travel circumstances. After S8, the operation proceeds to S9.

At S9, based on the contact risk information transmitted from the direction information acquisition device 3, the controller 6 determines whether there is an obstacle carrying a high risk of contact with the subject vehicle. In other words, it is determined whether there is a risk of contact. When it is determined that there is a risk of contact, the determination YES is made at S9, the operation proceeds to S10. When it is determined that there is no risk of contact, the determination NO is made at S9, the operation returns to S2.

At S10, based on the obstacle approach direction information transmitted from the direction information acquisition device 3 and the result of the detection by the contact detection device 5, the controller 6 controls the stimulator device 4 in such manner that, at the driver's grip position on the steering wheel 7 (i.e., one hand grip position in this case), the stimulator device 4 generates the stimulation to invoke an apparent movement that appears to the driver as if the skin sensation moves in a way indicative of the direction in accordance with the obstacle approach direction. Through causing the stimulator device 4 to generate the above stimulation to provide the apparent movement to the driver, the controller 6 presents obstacle approach direction information, i.e., information about a direction from which the obstacle is approaching the subject vehicle. After S10, the flow returns to S2.

More specifically, when it is determined at S7 that the driver is gripping the steering wheel 7 with the right hand, the controller 6 controls the stimulator device 4 and operates multiple vibrators 41 of the stimulator device 4 in such manner that the multiple vibrators 41 of the stimulator device 4 are successively vibrated in the order in accordance with the setting for "one hand gripping (right hand) case" illustrated in FIG. 3. One relevant example situation may as follows; the driver is gripping the steering wheel 7 with the right hand; an obstacle is approaching from the right side at a blind intersection; and it is determined that the obstacle carries the risk of contact. In this situation, multiple vibrators 41 of the stimulator device 4 may be successively vibrated in the order of the outer peripheral side vibrator $41B_{out}$ and the inner peripheral side vibrator $41B_{in}$ until the obstacle passes the subject vehicle.

When it is determined at S7 that the driver is gripping the steering wheel 7 with the left hand, the controller 6 controls the stimulator device 4 and operates multiple vibrators 41 of the stimulator device 4 in such manner that the multiple vibrators 41 of the stimulator device 4 are successively vibrated in the order in accordance with the setting for "one hand (left hand) gripping case". One relevant example situation may as follows; the driver is gripping the steering wheel 7 with the left hand; an obstacle is approaching from the right side at a blind intersection; and it is determined that the obstacle carries the high risk of contact. In this stimulation, multiple vibrators 41 of the stimulator device 4 may be successively vibrated in the order of the inner peripheral side vibrator $41E_{in}$ and the outer peripheral side vibrator $41E_{out}$ until the obstacle passes the subject vehicle.

The operation illustrated in FIG. 4 is ended when the ignition switch of the subject vehicle is turned off, even if the information presentation apparatus 2 is in operation at any step.

At S6 or S10, by invoking the apparent movement, the information presentation apparatus 2, presents information about a direction from which the obstacle is approaching the subject vehicle. At S6 or S10, the information presentation apparatus 2 may further display a warning on a display (not shown) of the accident contact prevention apparatus 1 or output a warning sound from a sound output device (not shown) of the accident contact prevention apparatus 1. According to the above configuration, since it is possible to present the direction information to the driver gripping the steering wheel 7 not only by invoking the apparent movement but also by displaying a warning or outputting a warning sound, it is possible to cause the driver to recognize the direction information in a more clearer manner.

In a human body, peripheral nerve for transmitting stimulation is especially concentrated on palms and fingers, which typically contact with the steering wheel 7 when the driver grips the steering wheel 7. Thus, via the palms and fingers, it is possible to allow the driver to clearly recognize the information about the direction from which the obstacle is approaching the subject vehicle.

According to the above configuration, since the information is presented through the skin sensation, a driver can receive the presented information even in a situation where the driver has a difficulty of seeing or hearing the present information due to viewpoint movement or noise. Therefore, a drive can surely and reliably receive the presented information while concentrating on driving.

In the above embodiment, the direction information acquisition device 3 acquires the obstacle approach direction information as direction information from the accidental contact prevention apparatus 1, and the stimulator device 4 provides an apparent movement to the driver so that the apparent movement appears as if the skin sensation moves in a way indicative of the direction in accordance with the obstacle approach direction information. However, the direction information provided to the driver is not limited to the obstacle approach direction information. The above embodiment is applicable to any information about direction, regardless of what apparatus is a source of the information about direction. For example, as shown in FIG. 1 also, the information presentation system 100 may include a navigation apparatus 1 in place of or in addition to the accident contact prevention apparatus 1. The navigation apparatus 1 retrieves a route to a destination of the subject vehicle and performs guidance about a vehicle travel direction based on the retrieved route. Information about the vehicle travel direction is information about a direction in which the vehicle is to travel according to the retrieved route. Thus, the information about the vehicle travel direction can act as the direction information. From the navigation apparatus 1, the direction information acquisition device 3 may acquire the direction information, more specifically, the information about the vehicle travel direction. The stimulator device 4 may provide an apparent movement to the driver so that the apparent movement appears as if the skin sensation moves in a way indicative of the vehicle travel direction according to the direction information.

In the above embodiment, even when a driver grips the steering wheel 7 with one hand, information about a front/back direction and information about a left/right direction can be presented by a combination of a vibration order of four vibrators 41, which include (i) two vibrators 41 arranged in the radial direction from the inner peripheral side of the outer peripheral side of the steering wheel 7 and (ii) two vibrators 41 arranged in a circumferential direction of the steering wheel 7. However, the combination of a vibration order is not limited to the above-described examples. For example, in addition to the information about a front/back direction and the information about a left/right direction, information about an oblique direction may be presented by changing an order in which the four vibrators 41 are successively vibrated.

In the above embodiment, when the driver grips the steering wheel 7 with one hand, the one hand contacts with at least four vibrators 41 arranged as 2×2 in the radial direction and the circumferential direction of the steering wheel 7. Alternatively, the one hand may contact with more than four vibrators 41. By combining an order of successive vibration of the more than four vibrators 41 in various ways, information about various directions may be presented in addition to the information about a front/back direction and the information about a left/right direction. For example, information about an oblique direction, rotation direction, a bend direction, and the like may be presented.

In the above embodiment, even when a driver grips the steering wheel 7 with one hand, information about a front/back direction and information about a left/right direction can be presented using four vibrators 41 arranged as 2×2 having two columns in the radial direction and two rows in the circumferential direction of the steering wheel 7. However, a configuration of vibrators 41 is not limited to that of the four vibrators 41. For example, the information about a front/back direction and the information about a left/right direction may be presented using such three vibrators 41 that includes one of the two columns of the four vibrators 41 and one of the two rows of the four vibrators 41 while one vibrator is shared by the one of the two columns and the one of the two rows. In this case, at least one pressure sensitive element is arranged to correspond to a group of these three vibrators 41.

In the above embodiment, the multiple vibrators 41 of the stimulator device 4 and the multiple pressure sensitive elements of the contact detection device 5 are arranged on a driver side surface of the steering wheel 7. The driver side surface is a surface to face a driver. However, a surface on which the multiple vibrators 41 and the multiple pressure sensitive elements are arranged is not limited to the driver side surface. For example, the multiple vibrators 41 of the stimulator device 4 and the multiple pressure sensitive elements of the contact detection device 5 may be arranged on a front side surface or a lateral side surface of the steering wheel 7. The front side surface faces in the front direction of the subject vehicle, and is a surface opposite to the driver side surface. The lateral side surface faces towards a lateral side of the subject vehicle, i.e., faces in the width direction of the subject vehicle. Alternatively, the multiple vibrators 41 of the stimulator device 4 and the multiple pressure sensitive elements of the contact detection device 5 may be arranged on two or more of the driver side surface, the front side surface and the lateral side surface of the steering wheel 7, as shown in FIG. 2B for instance.

In the above embodiment, the stimulator device 4 successively generates the stimulation at multiple sites arranged in the circumferential direction of the steering wheel 7, thereby providing an apparent movement to the driver so that the apparent movement appears as if the skin sensation moves in a front/back direction of the subject vehicle. Alternatively, the stimulator device 4 may successively generates the stimulation at multiple sites arranged in a rotation axis direction of the steering wheel 7, thereby providing an apparent movement to the driver so that the apparent movement appears as if the skin sensation moves in a front/back direction of the subject vehicle, as shown in FIG. 2B. More specifically, the stimulator device 4 may successively generate the stimulation at multiple sites that are different from each other in position along the rotation axis direction and that are the substantially same in position along the circumferential direction. In other words, the stimulator device 4 may successively generates the stimulation at multiple sites arranged in a line in the front/back direction of the subject vehicle.

In the above embodiment, the multiple vibrators 41 of the stimulator device 4 and the multiple pressure sensitive elements of the contact detection device 5 are arranged on only a part, which are two portions located near the right hand side portion 8a and the left hand side portion 8b, of a surface on the steering wheel 7. Alternatively, the multiple vibrators 41 of the stimulator device 4 and the multiple pressure sensitive elements 51 of the contact detection device 5 may be arranged all around the steering wheel 7 in the circumferential direction of the steering wheel 7, as shown in FIG. 5.

In this case, whichever portion of the steering wheel is gripped by the driver, it is possible to provide the stimulation invoking the skin sensation to the driver from at least some of the multiple sites arranged all around the steering wheel 7 in the circumferential direction. Therefore, whichever portion of the steering wheel is gripped by the driver, it is possible to allow the driver to recognize the information about a front/back direction in a more intuitive and clear manner.

The multiple vibratos of the stimulator device 4 may include vibrators 41 arranged in a single line all around the steering wheel 7 in the circumferential direction of the steering wheel 7. In this case, even when the driver grips the steering wheel 7 with both hands at any grip positions on the steering wheel 7, it is possible to provide the stimulation creating the skin sensation to the driver from at least multiple sites that are different from each other in position in the left/right direction. Therefore, when the driver is gripping the steering wheel 7 with both hands, it is possible to allow the driver to recognize the information about a left/right direction in addition to the information about a front/back direction in a more intuitive and clear manner regardless of whatever portions of the steering wheel 7 the driver is gripping.

The multiple vibrators 41 of the stimulator device 4 may include vibrators 41 arranged in multiple lines all around the steering wheel 7 in the circumferential direction of the steering wheel 7. In this case, even when the driver grips the steering wheel 7 with one hand at any grip position on the steering wheel 7, it is possible to provide the stimulation creating the skin sensation to the driver from at least multiple sites arranged in the radial direction from the inner periphery side to the outer periphery side of the steering wheel 7. Therefore, when the driver grips the steering wheel 7 with one hand, it is possible to allow the driver to recognize the information about a left/right direction in addition to the information about a front/back direction in a more intuitive and clear manner regardless of whatever portion of the steering wheel 7 the driver is gripping.

In the above embodiment, the multiple vibrators 41 are used as an example of means for generating the stimulation to provide the skin sensation to the driver. Alternatively, a device other than a vibrator may be used as means for generating the stimulation to provide the skin sensation to the driver. For example, multiple local pressing force generation elements for generating local pressing force may be used to provide skin sensation to the driver. The local pressing force generation element is for example, an artificial muscle element.

According to this configuration, since it is possible to generate the local pressing force, it is possible to more locally apply stimulation as compared to the use of a vibrator. Therefore, it is possible to provide a more definite apparent movement to the driver.

Alternatively, as means for generating the stimulation providing the skin sensation to the driver, the stimulator device 4 may include multiple elements each locally outputting wind to provide the skin sensation to the driver, or may include multiple elements each locally generating a stimulating electric current to provide the skin sensation to the driver.

In the above embodiment, the stimulator device 4 uses multiple vibrators 41, multiple local pressing force generation elements or the like, and applies the stimulation to the driver gripping the steering wheel 7 to invoke tactile sensation, thereby providing the apparent movement to the driver. However, the stimulator device 4 may apply the stimulation to the driver to create skin sensation other than the tactile sensation, in order to provide the apparent movement to the driver. For example, the stimulator device 4 may apply the stimulation creating pain sensation to the driver gripping the steering wheel 7 by, for example, increasing the local pressing forces of the multiple local pressing force generation elements of the stimulator device 4. Specifically, an area for each local pressing force generation element to contact with the driver in pressing the driver's hand or fingers may be decreased. Alternatively, the stimulator device 4 may include multiple elements for generating and absorbing heat such as thermoelectric elements and the like, and may apply the stimulation creating temperature sensation to the driver gripping the steering wheel 7 in order to provide the apparent movement.

By using at least one of frequency of the stimulation, magnitude of the stimulation and duration of the stimulation, the elements for applying the above-described stimulation apply the stimulation (e.g., vibration) to the driver to provide the apparent movement.

In the above embodiment, the stimulator device 4 includes multiple elements such as multiple vibrators 41, multiple local pressing force generation elements and the like. Alternatively, the stimulator device 4 may not include multiple elements but a single element when the single element can generate the stimulation at multiple sites.

In the above embodiment, the contact detection device 5 includes the multiple pressure sensitive elements acting as means for detecting which portion on the steering wheel 7 the driver of the subject vehicle is gripping. Alternatively, the contact detection device 5 may includes an element other than the multiple pressure sensitive elements, as long as the element can detect a portion on the steering wheel 7 gripped by the driver of the subject vehicle. For example, the contact detection device 5 may includes an element that senses an electrostatic capacitance change to detect a portion on the steering wheel 7 gripped by the driver of the subject vehicle.

The present disclosure has the following aspects.

According to a first aspect, an information presentation apparatus for a vehicle includes a stimulator device, a direction information acquisition device and a controller. The stimulator device is located on a steering wheel of the vehicle and configured to generate stimulation at a plurality of sites on the steering wheel. The stimulation causes a driver gripping the steering wheel to have skin sensation. The direction information acquisition device acquires direction information. In accordance with the direction information acquired by the direction information acquisition device, the controller causes the stimulator device to successively generate the stimulation through the plurality of sites on the steering wheel. The successively generated stimulation invokes an apparent movement that appears to the driver as if the skin sensation moves in a way indicative of a direction according to the direction information.

According to the above information presentation apparatus, the driver gripping the steering wheel can perceive such an apparent movement that appears as if the skin sensation moves in the way indicative of the direction according to the direction information. Therefore, the above information presentation apparatus enables the driver to clearly and intuitively recognize the direction information.

Fingers and a palm of the driver, which normally contact with the steering wheel when the driver grips the steering wheel, are portions of a human body on which peripheral nerve for transmitting stimulation is especially concentrated. Thus, the above information presentation apparatus enables the driver's clearer recognition of the direction information.

The above information presentation apparatus may be configured as follows. The stimulation generated by the stimulator device causes the driver to have, as the skin sensation, at least one of tactile sensation, pain sensation and temperature sensation.

According to this configuration, it is possible to allow the driver to recognize the direction information in a more clear and intuitive manner.

The above information presentation apparatus may be configured as follows. The information presentation apparatus further includes a touch detector device configured to detect which portion of the steering wheel the driver is gripping. The controller causes the stimulator device to successively generate the stimulation in the potion of the steering wheel detected by the touch detector device, the successively generated stimulation invoking the apparent movement.

According to the above configuration, the stimulator device can generate the stimulation in only the driver's gripping portion of the steering wheel. Therefore, it is possible to prevent the stimulator device from uselessly generating the stimulation in a portion not gripped by the driver. It is possible cut waste.

In addition, it is possible to determine whether the driver is gripping the steering wheel with one hand or both hands, based on detecting whether multiple portions of the steering wheel are gripped by the driver. Therefore, depending on whether the driver is gripping the steering wheel with both hands or one hand, it is possible to switch the stimulation generated by the stimulator device, so that in both of a one-hand-gripping case and a both-hands-gripping case, the driver can perceive the apparent movement that appears as if the skin sensation moves in the way indicative of the direction according to the direction information.

The above information presentation apparatus may be configured as follow. The stimulator device successively generates the stimulation at a group of sites arranged in a width direction of the vehicle, the group of sites being included in the plurality of sties.

According to the above configuration, on the steering wheel, the stimulator device can successively generate the stimulation at the group of sites arranged in the width direction of the vehicle. Thereby, it is possible to invoke the apparent movement that appears to the driver as if the skin sensation moves in the width direction (i.e., a left/right direction) of the vehicle. For example, when the driver is gripping the steering wheel with both hands, the stimulator device can successively generate the stimulation from a left hand side to a right hand side, and thereby, the driver can perceive the apparent movement that appears as if the skin sensation moves in a right direction of the vehicle. Similarly, the stimulator device can successively generate the stimulation from the right hand side to the left hand side, and thereby, the driver can perceive the apparent movement that appears as if the skin sensation moves in a left direction of the vehicle. As can be seen from the above, the above configuration allows the driver to recognize information about the right direction and the left direction in a more clear and intuitive manner.

The above information presentation apparatus may be configured as follows. The stimulator device successively generates the stimulation at a group of sites arranged in a line in a radial direction of the steering wheel, the group of sites being included in the plurality of sties, the radial direction being a direction from an inner peripheral side to an outer peripheral side of the steering wheel.

According to this configuration, the stimulator device can successively generate the stimulation at the group of sites arranged in a line in the radial direction of the steering wheel. Thereby, it is possible to invoke the apparent movement that appears to the driver as if the skin sensation moves in the left/right direction of the vehicle. Referring to exemplary cases, this will be more specifically illustrated based on assumption that the driver is gripping one of predetermined two portion of the steering wheel with his or her one hand, wherein the predetermined two portions may be portions that are positioned at 10 o'clock and 10 minutes, and that are normally gripped by the driver with both hands when the vehicle is traveling straight. Suppose that the driver is gripping the steering wheel with only the right hand. In this case, when the stimulator device successively generates the stimulation from the inner periphery side to the outer periphery side, the driver can perceive the apparent movement as if the skin sensation moves in the right direction of the vehicle. When the stimulator device successively generates the stimulation from the outer peripheral side to the inner peripheral side, the driver can perceive the apparent movement as the skin sensation moves in the left direction of the vehicle. When the driver is gripping the steering wheel with only the right hand, a reversed manner can be used. As can be seen from the above, even when the driver is gripping the steering wheel with one hand, it is possible to allow the driver to recognize the information about the right direction and the left direction in a more clear and intuitive manner.

The above information presentation apparatus may be configured as follows. The stimulator device successively generates the stimulation at a group of sites arranged in a line in the circumferential direction of the steering wheel so that the stimulation is successively generated in a predetermined range on the steering wheel, the predetermined range being defined in the circumferential direction of the steering wheel, the group of sites being included in the plurality of sties.

According to the above configuration, the predetermined range may contain a portion that is to contact with one hand when the driver is gripping the steering wheel. In this case, when the stimulator device successively generates the stimulation at the group of sites arranged in the line in the predetermined range in the circumferential direction of the steering wheel, it is possible to cause the driver to perceive the apparent movement as if the skin sensation moves in an upper/lower direction of the vehicle. It should be noted that since the upper/lower direction of the vehicle typically corresponds to a front/back direction of the vehicle on a two-dimensional or three-dimensional map displayed on a display device of an in-vehicle navigation apparatus, the driver generally recognizes the upper/lower direction as the front/back direction. Referring to exemplary cases, this will be more specifically illustrated based on assumption that the driver is gripping at least one of predetermined two portion of the steering wheel with his or her one hand, wherein the predetermined two portions may be portions that are positioned at 10 o'clock and 10 minutes, and that are normally gripped by the driver with both hands when the vehicle is traveling straight. Suppose that the driver is gripping the steering wheel. In this case, when the stimulator device successively generate the stimulation from an upper side portion to a lower side portion of the steering wheel along the circumferential direction, the driver can perceive the apparent movement appearing as if the skin sensation moves in the back direction of the vehicle. When the stimulator device successively generates the stimulation from the lower side portion to the upper side portion along the circumferential direction, the driver can perceive the apparent movement as if the skin sensation moves in the front direction of the vehicle. As can be seen from the above, the above configuration allows the driver to recognize the information about the front direction and the back direction in a more clear and intuitive manner.

The information presentation apparatus may be configured as follows. The stimulator device successively generates the stimulation at a group of sites arranged in a line in a rotation axis direction of the steering wheel, the group of sites being included in the plurality of sties.

According to the above configuration, on the steering wheel, the stimulator device can successively generating the stimulation at the group of sites arranged in the rotation axis direction of the steering wheel, and thereby, the apparent movement appears to the driver as if the skin sensation moves in the front/back direction of the vehicle. For example, when the stimulator device secretively generates the stimulation from a driver close side portion (i.e., a portion closer to a driver) to a driver distant portion (i.e., a portion closer to the front of the vehicle as compared to the driver close side portion) of the steering wheel, it is possible to invoke the apparent movement that appears to the driver as if the skin sensation moves in the front direction of the vehicle. When the stimulator device successively generates the stimulation from the driver distant side portion to the driver close side portion of the steering wheel, it is possible to invoke the apparent movement that appears to the driver as if the skin sensation moves in the back direction of the vehicle. As can be seen from the above, the above configuration allows the driver to recognize the information about the front/back direction in a more institutive and clear manner.

The above information presentation apparatus may configured such that: the stimulator device successively generates the stimulation at the group of sites arranged in the line in the circumferential direction so that the stimulation is successively generated in the predetermined range on the steering wheel, the predetermined range being defined in the circumferential direction of the steering wheel and a radial direction of the steering wheel. Alternatively, the information presentation apparatus may be configured such that: the stimulator device successively generates the stimulation at the group of sites arranged in an array in the rotation axis direction of the steering wheel and a radial direction of the steering wheel so that the stimulation is successively generated in a predetermined range on the steering wheel. In the above, the radial direction is a direction from an inner peripheral side to an outer peripheral side of the steering wheel According to above configuration, the predetermined range may contain a portion that is to contact with one hand when the driver is gripping the steering wheel. In this case, it is possible to allow the driver to recognize information about the left/right direction and the front/back direction in a more intuitive and clear manner.

The above information presentation apparatus may be configured as follows. The stimulator device successively generates the stimulation at a group of sites that is arranged in a line in a circumferential direction of the steering wheel as to be located all around the steering wheel, the group of sites included in the plurality of sites.

According to the above configuration, regardless of which portion of the steering wheel the driver is gripping, it is possible to apply the stimulation, which creates the skin sensation, to the driver from at least the group of sites arranged in the line all around the steering wheel in the circumferential direction. That is, it is possible to invoke the apparent movement that appears to the driver as if the skin sensation moves in the front/back direction of the vehicle, as described above. Therefore, regardless of which portion of the steering wheel the driver is gripping, it is possible to allow the driver to recognize information at least the front/back direction in a more intuitive and clear manner.

Furthermore, when the driver is gripping the steering wheel with both hands, it is possible to apply the stimulation, which creates the skin sensation, to the driver from at least some sites arranged in the width direction of the vehicle, regardless of which portions of the steering wheel the driver is gripping. As can be seen from the above, as long as the driver is gripping the steering wheel with both hands, it is possible to allow the driver to recognize information about the front/back direction and the left/right direction in a more intuitive and clear manner, regardless of which portions of the steering wheel the driver is gripping.

The above information presentation apparatus may be configured as follows. The group of sites, at which the stimulator device successively generates the stimulation, are arranged in two or more lines in the circumferential direction of the steering wheel so as to be located all around the steering wheel.

According to the above configuration, regardless of which portion of the steering wheel the driver is gripping, it is possible apply the stimulation, which creates the skin sensation, to the driver at least from a set of sites arranged in the circumferential direction of the steering wheel and another set of sites arranged in the radial direction of the steering wheel. Therefore, regardless of which portion of the steering wheel the driver is gripping, it is possible to allow the driver to recognize information about the front/back direction and the left/right direction in a more intuitive and clear manner.

The above information presentation apparatus may be configured as follows. The stimulator device includes a plurality of stimulation elements, thereby generating the stimulation at the plurality of sites on the steering wheel. The plurality of stimulation elements is a plurality of vibrators.

According to the above configuration, the driver can recognize the direction information in a more intuitive and clear manner.

The above information presentation apparatus may be configured as follows. The plurality of elements is a plurality of local pressing force generation elements each generating a local pressing force.

According to the above configuration, since it is possible to generate the local pressing force, it is possible to apply more-localized stimulation to the driver gripping the steering wheel, compared to a case where the vibrator for generating vibrator is used as the stimulation element. Therefore, it is possible to cause the driver to perceive the apparent movement in a more definite way.

The above information presentation apparatus may be configured as follows. By using at least one of frequency of the stimulation, magnitude of the stimulation and duration of the stimulation, the stimulator device generates the stimulation invoking the apparent movement.

According to the above configuration, it is possible to allow the driver to recognize the direction information in a more intuitive and clear manner.

According to a second aspect of the present invention, an information presentation system for a vehicle includes the information presentation apparatus recited in claim 1 and a navigation apparatus. The navigation apparatus retrieves a route to a destination of the vehicle and performs guidance about vehicle travel direction based on the retrieved route. The vehicle travel direction is a direction in which the vehicle is to travel. The direction information acquisition device of the information presentation apparatus acquires, as the direction information, information about the vehicle travel direction from the navigation apparatus. In accordance with the information about the vehicle travel direction acquired by the direction information acquisition device, the controller of the information presentation apparatus causes the stimulator device to successively generate the stimulation through the plurality of sites on the steering wheel. The successively generated stimulation invokes an apparent movement that appears to the driver as if the skin sensation moves in the way according to the information about the vehicle travel direction.

According to the above information presentation system, it is possible to allow the driver to recognize information about the vehicle travel direction in a more intuitive and clear manner.

According to a third aspect of the present invention, an information presentation system for a vehicle includes the information presentation apparatus recited in the first aspect and an obstacle detection apparatus. The obstacle detection apparatus detects from which direction an obstacle is approaching the vehicle, thereby providing information about an obstacle approach direction. The direction information acquisition device of the information presentation apparatus acquires, as the direction information, the information about the obstacle approach direction from the obstacle detection apparatus. In accordance with the information about the obstacle approach direction acquired by the direction information acquisition device, the controller of the information presentation apparatus causes the stimulator device to successively generate the stimulation through the plurality of sites on the steering wheel. The successively generated stimulation invokes an apparent movement that appears to the driver as if the skin sensation moves in the way according to the information about the obstacle approach direction.

According to the above information presentation system, it is possible to allow the driver to recognize information about the obstacle approach direction in a more intuitive and clear manner.

It is to be understood that the invention is not limited to the above described embodiments and constructions. The above embodiments can be modified and/or combined in various ways without departing from sprit and scope of the present invention.

What is claimed is:

1. An information presentation apparatus for a vehicle, comprising:
   a stimulator device located on a steering wheel of the vehicle and configured to generate stimulation at a plurality of sites on the steering wheel, the stimulation causing a driver gripping the steering wheel to have skin sensation;
   a direction information acquisition device configured to acquire direction information; and
   a controller configured to cause, in accordance with the direction information acquired by the direction information acquisition device, the stimulator device to successively generate the stimulation through the plurality of sites on the steering wheel, the successively generated stimulation invoking an apparent movement that appears to the driver as if the skin sensation moves in a way indicative of a direction according to the direction information, wherein:
   the stimulator device successively generates the stimulation at a group of sites arranged in a line in a radial direction of the steering wheel, the group of sites being included in the plurality of sites, the radial direction being a direction from an inner peripheral side to an outer peripheral side of the steering wheel.

2. The information presentation apparatus of claim 1, wherein:
   the stimulation generated by the stimulator device causes the driver to have, as the skin sensation, at least one of tactile sensation, pain sensation and temperature sensation.

3. The information presentation apparatus of claim 1, further comprising:
   a touch detector device configured to detect which portion of the steering wheel the driver is gripping,
   wherein:
   the controller causes the stimulator device to successively generate the stimulation in the portion of the steering wheel detected by the touch detector device, the successively generated stimulation invoking the apparent movement.

4. The information presentation apparatus of claim 1, wherein:
   the stimulator device successively generates the stimulation at another group of sites arranged in a width direction of the vehicle, the another group of sites being included in the plurality of sites.

5. The information presentation apparatus of claim 1, wherein:
   the stimulator device successively generates the stimulation at another group of sites arranged in a line in a circumferential direction of the steering wheel so that the stimulation is successively generated in a predetermined range on the steering wheel, the predetermined range being defined in the circumferential direction of the steering wheel, the another group of sites being included in the plurality of sites.

6. The information presentation apparatus of claim 5, wherein:
   the stimulator device successively generates the stimulation at the another group of sites arranged in the line in the circumferential direction so that the stimulation is successively generated in the predetermined range on the steering wheel, the predetermined range being defined in
   the circumferential direction of the steering wheel and the radial direction of the steering wheel.

7. The information presentation apparatus of claim 1, wherein:
   the stimulator device successively generates the stimulation at another group of sites arranged in a line in a rotation axis direction of the steering wheel, the another group of sites being included in the plurality of sites.

8. The information presentation apparatus according to claim 7, wherein:
   the stimulator device successively generates the stimulation at the another group of sites arranged in the rotation axis direction of the steering wheel and the radial direction of the steering wheel so that the stimulation is successively generated in a predetermined range on the steering wheel.

9. The information presentation apparatus according to claim 1, wherein:
   the stimulator device includes a plurality of stimulation elements, thereby generating the stimulation at the plurality of sites on the steering wheel.

10. The information presentation apparatus according to claim 9, wherein:
    the plurality of stimulation elements is a plurality of vibrators.

11. The information presentation apparatus according to claim 9, wherein:

the plurality of elements is a plurality of local pressing force generation elements each generating a local pressing force.

12. The information presentation apparatus according to claim 1, wherein:
by using at least one of frequency of the stimulation, magnitude of the stimulation and duration of the stimulation, the stimulator device generates the stimulation invoking the apparent movement.

13. An information presentation apparatus for a vehicle, comprising:
a stimulator device located on a steering wheel of the vehicle and configured to generate stimulation at a plurality of sites on the steering wheel, the stimulation causing a driver gripping the steering wheel to have skin sensation;
a direction information acquisition device configured to acquire direction information; and
a controller configured to cause, in accordance with the direction information acquired by the direction information acquisition device, the stimulator device to successively generate the stimulation through the plurality of sites on the steering wheel, the successively generated stimulation invoking an apparent movement that appears to the driver as if the skin sensation moves in a way indicative of a direction according to the direction information,
wherein:
the stimulator device successively generates the stimulation at a group of sites that are arranged in a line in a circumferential direction of the steering wheel so as to be located all around the steering wheel, the group of sites included in the plurality of sites.

14. The information presentation apparatus according to claim 13, wherein:
the group of sites, at which the stimulator device successively generates the stimulation, are arranged in two or more lines all around the steering wheel in the circumferential direction of the steering wheel.

15. The information presentation apparatus of claim 13, wherein:
the stimulation generated by the stimulator device causes the driver to have, as the skin sensation, at least one of tactile sensation, pain sensation and temperature sensation.

16. The information presentation apparatus of claim 13, further comprising:
a touch detector device configured to detect which portion of the steering wheel the driver is gripping,
wherein:
the controller causes the stimulator device to successively generate the stimulation in the portion of the steering wheel detected by the touch detector device, the successively generated stimulation invoking the apparent movement.

17. The information presentation apparatus of claim 13, wherein:
the stimulator device successively generates the stimulation at another group of sites arranged in a width direction of the vehicle, the group of sites being included in the plurality of sites.

18. The information presentation apparatus of claim 13, wherein:
the stimulator device successively generates the stimulation at another group of sites arranged in a line in a radial direction of the steering wheel, the another group of sites being included in the plurality of sites, the radial direction being a direction from an inner peripheral side to an outer peripheral side of the steering wheel.

19. The information presentation apparatus of claim 13, wherein:
the stimulator device successively generates the stimulation at another group of sites arranged in a line in the circumferential direction of the steering wheel so that the stimulation is successively generated in a predetermined range on the steering wheel, the predetermined range being defined in the circumferential direction of the steering wheel, the another group of sites being included in the plurality of sites.

20. The information presentation apparatus of claim 19, wherein:
the stimulator device successively generates the stimulation at the another group of sites arranged in the line in the circumferential direction so that the stimulation is successively generated in the predetermined range on the steering wheel, the predetermined range being defined in
the circumferential direction of the steering wheel and
a radial direction of the steering wheel, the radial direction being a direction from an inner peripheral side to an outer peripheral side of the steering wheel.

21. The information presentation apparatus of claim 13, wherein:
the stimulator device successively generates the stimulation at another group of sites arranged in a line in a rotation axis direction of the steering wheel, the another group of sites being included in the plurality of sites.

22. The information presentation apparatus according to claim 21, wherein:
the stimulator device successively generates the stimulation at the another group of sites arranged in the rotation axis direction of the steering wheel and a radial direction of the steering wheel so that the stimulation is successively generated in a predetermined range on the steering wheel, the radiation direction being a direction from an inner peripheral side to an outer peripheral side of the steering wheel.

23. The information presentation apparatus according to claim 13, wherein:
the stimulator device includes a plurality of stimulation elements, thereby generating the stimulation at the plurality of sites on the steering wheel.

24. The information presentation apparatus according to claim 23, wherein:
the plurality of stimulation elements is a plurality of vibrators.

25. The information presentation apparatus according to claim 23, wherein:
the plurality of elements is a plurality of local pressing force generation elements each generating a local pressing force.

26. The information presentation apparatus according to claim 13, wherein:
by using at least one of frequency of the stimulation, magnitude of the stimulation and duration of the stimulation, the stimulator device generates the stimulation invoking the apparent movement.

27. An information presentation system for a vehicle, comprising:
the information presentation apparatus recited in claim 1; and
a navigation apparatus configured to retrieve a route to a destination of the vehicle and perform guidance about vehicle travel direction based on the retrieved route, the vehicle travel direction being a direction in which the vehicle is to travel, wherein:

the direction information acquisition device of the information presentation apparatus acquires, as the direction information, information about the vehicle travel direction from the navigation apparatus; and in accordance with the information about the vehicle travel direction acquired by the direction information acquisition device, the controller of the information presentation apparatus causes the stimulator device to successively generate the stimulation through the plurality of sites on the steering wheel, the successively generated stimulation invoking the apparent movement that appears to the driver as if the skin sensation moves in the way according to the information about the vehicle travel direction.

28. An information presentation system for a vehicle, comprising:

the information presentation apparatus recited in claim 1; and an obstacle detection apparatus configured to detect from which direction an obstacle is approaching the vehicle, thereby providing information about an obstacle approach direction;

wherein:

the direction information acquisition device of the information presentation apparatus acquires, as the direction information, the information about the obstacle approach direction from the obstacle detection apparatus;

in accordance with the information about the obstacle approach direction acquired by the direction information acquisition device, the controller of the information presentation apparatus causes the stimulator device to successively generate the stimulation through the plurality of sites on the steering wheel, the successively generated stimulation invoking the apparent movement that appears to the driver as if the skin sensation moves in the way according to the information about the obstacle approach direction.

29. An information presentation system for a vehicle, comprising:

the information presentation apparatus recited in claim 13; and a navigation apparatus configured to retrieve a route to a destination of the vehicle and perform guidance about vehicle travel direction based on the retrieved route, the vehicle travel direction being a direction in which the vehicle is to travel, wherein:

the direction information acquisition device of the information presentation apparatus acquires, as the direction information, information about the vehicle travel direction from the navigation apparatus; and in accordance with the information about the vehicle travel direction acquired by the direction information acquisition device, the controller of the information presentation apparatus causes the stimulator device to successively generate the stimulation through the plurality of sites on the steering wheel, the successively generated stimulation invoking the apparent movement that appears to the driver as if the skin sensation moves in the way according to the information about the vehicle travel direction.

30. An information presentation system for a vehicle, comprising:

the information presentation apparatus recited in claim 13; and an obstacle detection apparatus configured to detect from which direction an obstacle is approaching the vehicle, thereby providing information about an obstacle approach direction;

wherein:

the direction information acquisition device of the information presentation apparatus acquires, as the direction information, the information about the obstacle approach direction from the obstacle detection apparatus;

in accordance with the information about the obstacle approach direction acquired by the direction information acquisition device, the controller of the information presentation apparatus causes the stimulator device to successively generate the stimulation through the plurality of sites on the steering wheel, the successively generated stimulation invoking the apparent movement that appears to the driver as if the skin sensation moves in the way according to the information about the obstacle approach direction.

* * * * *